Figure 1:
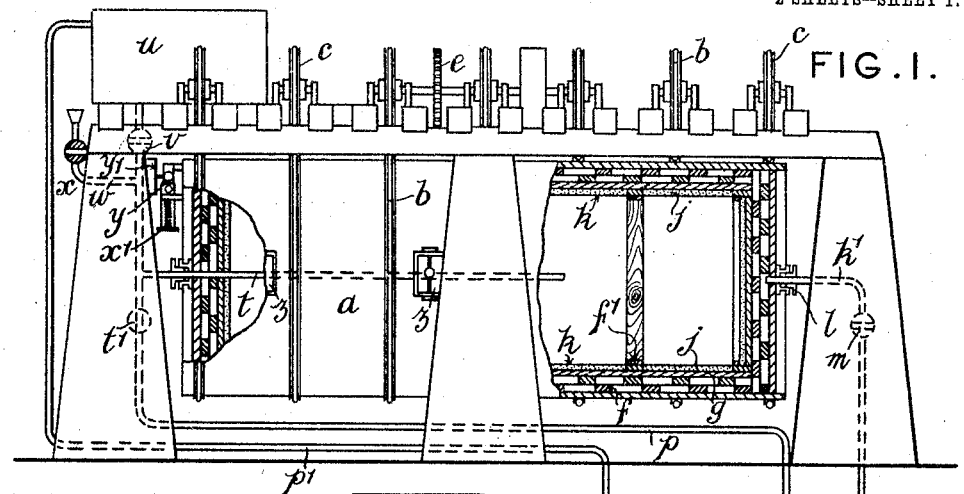

No. 768,319. PATENTED AUG. 23, 1904.
C. H. WEBB.
EXTRACTION OF METALS FROM ORES.
APPLICATION FILED JULY 14, 1903.
NO MODEL. 2 SHEETS—SHEET 1.

attest:
Edward Sarton

Inventor
Charles H. Webb.
by Ellis Spear & Company
Attys

No. 768,319. Patented August 23, 1904.

UNITED STATES PATENT OFFICE.

CHARLES HENRY WEBB, OF DORKING, ENGLAND, ASSIGNOR TO THE RAPID CYANIDE TREATMENT, LIMITED, OF LONDON, ENGLAND.

EXTRACTION OF METAL FROM ORES.

SPECIFICATION forming part of Letters Patent No. 768,319, dated August 23, 1904.

Application filed July 14, 1903. Serial No. 165,493. (No specimens.)

*To all whom it may concern:*

Be it known that I, CHARLES HENRY WEBB, a subject of the King of Great Britain and Ireland, residing at Dorking, in the county of Surrey, England, have invented a new and useful Improvement in and Relating to the Extraction of Metals from Ores, of which the following is a specification.

This invention relates to the treatment of solid material by liquid, and has for its object the carrying out of such treatment so that in the filtering stage the solid material is left with the minimum of liquid residual.

This invention is specially applicable to the treatment of ore by a solvent solution for the purpose of extracting the metal from the said ore in such a way that the metal-carrying solvent can be separated from the residual solid matter more efficiently and in much shorter time, more metal can be extracted, and less quantity of residual solvent is left in conjunction with the solid matter, and large quantities of ore can be handled at much cheaper rate than at present obtains with known processes and means.

This invention consists in a process of filtration through a filtering medium moving relatively to the liquid and in which the liquid is made as far as possible to percolate through the body of the material under treatment built up into layers and supported on any suitable filtering-support and maintained in that position during the process of filtration by a difference of pressure set up between the feeding and delivery sides of the filtering device.

The processes in use for the purpose of the separation of solid from liquid material used in the past where large operations are involved consisting in the first place of a decantation process which is very simple, but to which the chief objections are the question of time, and consequently the size of the plant necessary to deal with a given quantity, becomes a matter of considerable magnitude. In the second place another system already adapted is that of filter-presses, which undoubtedly obviates the time objection, but substitutes a large capital expenditure therefor, together with high costs for power, and, what is probably far more important, a considerable loss of extraction due to the solution remaining in the filter, for a reason which can readily be understood—viz., that in attempting to force out the liquid from the solid material in the filter-bags under high pressure through the external parts of the cake the particles become very closely packed and form a practically hermetical envelop inclosing the inner parts of the cake in a very moist condition, embracing such moisture, and preventing its expulsion through the hard outer envelop. Further treatment by a wash-water to dilute the residual moisture left in the cake cannot be successfully effected owing to the consolidation of the outer parts thereof.

This invention entirely overcomes the above objections and enables filtration to be carried on at a high rate. The particles of the material are very loosely packed above one another, but sufficiently close, on the one hand, to prevent them falling from the filtering-surface and sufficiently loose, on the other hand, to permit of the liquid being led therefrom.

To carry the invention into effect, the ore after being crushed or partially crushed by any known suitable means is charged into a filter-vat which is adapted to be revolved. At either or both ends and along the sides of the filter-vat continuously or at intervals are placed suitable gratings covered with a filter cloth or cloths or other suitable porous support. The said cloths or other suitable porous support can, if desired, be protected by a layer of coarse sand or similar material, maintained in position on the filter-cloths by means of suitable gratings placed thereon. The filtering devices are so arranged within the vats that a space is left behind the filtering medium, and such spaces are connected with a pipe or pipes leading to the outside of the vat, through which the liquid passing through the filtering medium is led away from the vat. The vat, if desired, may be fitted with a central filtering device, so as to extend the area of filtering-surface.

A pump, if desired, is arranged by which air can be passed through the charge in the vat, which tends to quicken the process of extraction of metal owing to the increased amount of oxygen which is thus brought into contact with the ore and the solvent solution, as is well known. The said pump can be reversed in its action to form a suction-pump from the vat, or a separate suction-pump can be provided whereby the solution can be withdrawn from the body of the ore in the vat through the filtering medium.

In order that this invention may be the better understood, I will now proceed to describe the same in relation to the drawings hereunto annexed, reference being had to the letters marked thereon.

Figure 2:
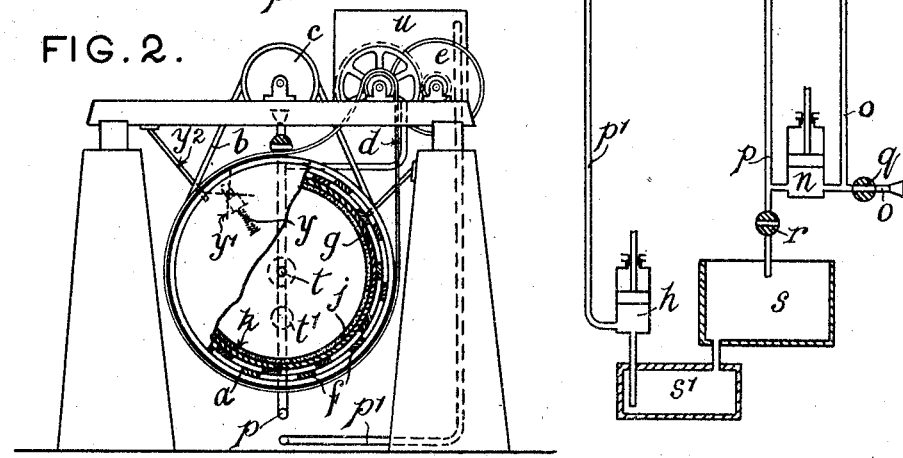
Figure 3:
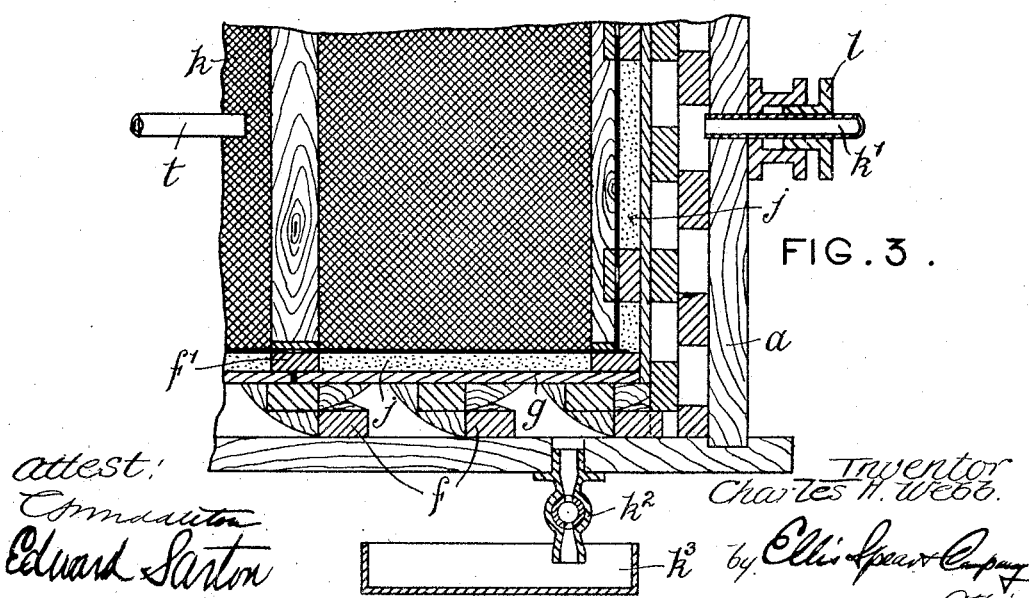
Figure 4:
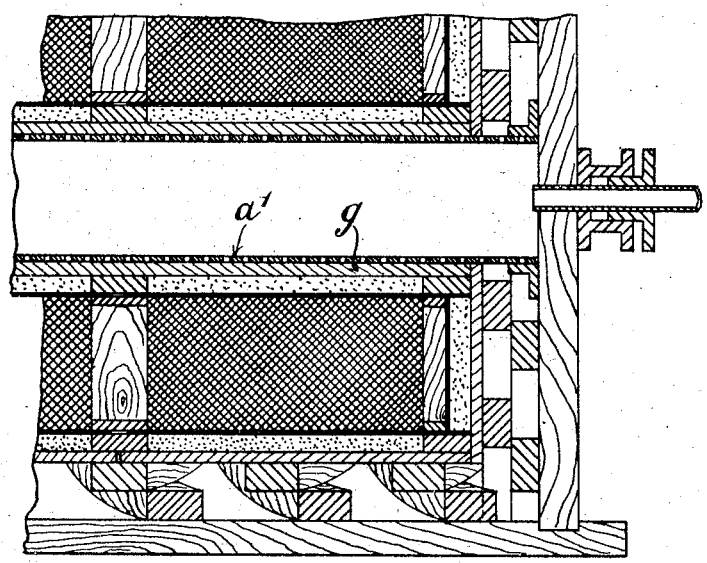

Figure 1 is a part-sectional side elevation of a revolving filtering-vat constructed and arranged according to my invention. Fig. 2 is an end part-sectional elevation of the same. Fig. 3 is an enlarged sectional detail view of a part of the vat, showing the construction of the filtering medium and the method of supporting the same within the vat. Fig. 4 is an enlarged sectional view of a part of a vat provided with a central cylinder for extending the filtering-surface.

The filtering-vat $a$ is cylindrical in form and is supported in slings $b$, carried over pulleys $c$. It is rotated by a driving-chain $d$, passed round the vat and driven by operating-gear $e$. Within the vat $a$ a grating is formed of strips of wood $f$, which are placed, preferably, diagonally across each other and secured to the internal periphery of the vat at an angle to the axis of the barrel, so that spaces are left between the strips of each layer. Over the grating thus formed the filtering medium— such, for example, as cocoanut matting $g$—is fastened. The same arrangement of grating and filter-cloth is provided at the ends of the barrel, and, if it is desired to further extend the filtering-surface, a central perforated cylinder $a'$ can be provided in the vat and coated with a filter-cloth $g$ or other suitable medium, as illustrated in Fig. 4.

The filter-cloth may be protected by a layer of sand $j$, spread thereon and kept in place by means of wire-gauze $k$, fastened upon the strips of wood $f$ in the case of the periphery and ends of the vat and in the case of the cylinder by bands passing round the said cylinder.

At one end of the vat the pipe $k'$ passes through a gland $l$, so as to communicate with the spaces at the back of the filtering medium. This pipe serves to withdraw the liquid from the vat after it has passed through the filtering medium. The pipe $k'$ is connected by a cock $m$ with the suction-pipe $o$ of a pump $n$, which is provided with a cock $q$. I have found by experiment that the liquid after passing through the filtering medium takes the form of froth and is drawn by the suction of the pump $o$ to the exit-pipe $k'$. The residual froth left in the space after the operation is so small in quantity that when it subsides into liquid form the residual liquid rests in the lower portion of the annular space. The delivery-pipe $p$ has two cocks $r$ and $t'$, controlling two branches, one leading to the apparatus $s$ and the other to the pipe $t$, which is inserted in the opposite end of the vat through a gland, so as to communicate with the space containing the charge, so that by setting the said cocks $m$, $q$, $r$, and $t'$ in two alternative positions the pump can be used as an air-compressor delivering into the vat and afterward as a suction-pump for withdrawing the liquid and delivering it to any known apparatus $s$ for recovering the metal from the solution. This pipe $t$ is attached to a tank $u$, containing the chemical solution of water, if a wash solution is desirable, the supply of which is controlled by the cock $v$. An air-pipe $w$ with a cock $x$ branches from the pipe $t$, by which air is admitted to the vat during the withdrawal of the solution therefrom.

In order to relieve the air-pressure in the vat and permit of the escape of the deoxygenated air, a relief-cock $y$ is mounted on the vat and provided with an ordinary star-wheel $y'$, coacting with stops $y^2$, fixed on any suitable support and so arranged that when the vat is revolved the cock is opened during the period when the vat is passing through about ninety degrees of the upper part of its path and is closed during the remaining two hundred and seventy degrees. The object of this is to allow air only to escape and to prevent the escape of liquid. The cock $y$ may be provided, if necessary, with a spring-pressed relief-valve $a'$ to regulate the pressure within the vat.

Doors $z$ are provided in the sides of the vat for filling the vat and withdrawing the residue after treatment.

In carrying out my process the ore is charged into the vat through the doors $z$, and the solution is run into it from the tank $u$ by the pipe $t$. The doors $z$ are now closed and the vat revolved. During such revolution the pump $n$ forces air into the charge-vat, and the said air escapes at the relief-valve $y$ during the upper portion of its travel. After sufficient air has been passed through and the ore and solution have been sufficiently agitated the positions of the cocks $m$ $q$ $r$ $t'$ are changed and the air-cock $x$ is opened, so that the liquid is withdrawn from the vat through the filtering medium, the revolution of the vat being continued. The result of this action is that the ore or slimes are drawn toward the filter-cloth by the difference of pressure existing between the two sides of the filtering medium and become built up in successive layers to a considerable thickness upon the filter-cloth, forming an additional filtering medium of itself. After the liquid has been withdrawn the residue is found to be comparatively dry and is discharged from the vat through the doors $z$.

The layer of slime or residue remains on the filter-cloth so long as the barrel is revolving and the difference of pressure exists; but it falls immediately to the bottom of the vat on the cessation of these conditions.

If desirable, a cock or cocks $k^2$ may be arranged, as shown in Fig. 3, upon the periphery of the vat or at the end or ends thereof adjacent to the periphery, through which the bulk of the filtered solvent may be discharged into a tank or receptacle $k^3$, arranged below, so as to receive the solvent. When the bulk of the solvent has been so discharged, the cock or cocks $k^2$ can be closed and the remainder of the solvent be withdrawn by the pump.

In order to reduce the amount of chemical solution in use and also amount of metal in the residual solvent in the slime, I run the solution after treatment in the depositing device $s$ into a tank $s'$, from which it is pumped by a pump $h$ through a pipe $p'$ into the tank $u$, so as to be used as waste water in the vat. The process can in this way be worked continuously and at very small cost compared with known methods.

The residue in the vat after the herein-described treatment is much drier than that treated by a filter-press. Hence the residual liquid in my process is much less, and consequently more metal is extractable compared with known processes.

Having now described my invention, what I claim, and desire to secure by Letters Patent, is—

1. A process for the treatment of solid material by liquid and the final separation of the solid and liquid particles consisting of the mixing of the liquid and solid material in a closed revolving filter, assisting and maintaining the continued deposit and support, by a constant vacuum on the delivery side of the filter, of the solid residue upon the filtering-support so as to withdraw the moisture therefrom, discontinuing the vacuum to allow the fall by gravity of the dry residue from the filtering-support and removing the residue from the vat practically dry through suitable apertures, substantially as described.

2. A process for the treatment of solid material by liquid and the final separation of the solid and liquid particles consisting of the mixture of the liquid and solid material in a closed revolving filter, assisting and maintaining the continued deposit and support by a constant vacuum on the delivery side of the filter and by a gaseous pressure on the supply side of the filter, of the solid residue upon the filtering-support so as to withdraw the moisture therefrom, discontinuing the vacuum to allow the fall by gravity of the dry residue from the filtering-support and removing the residue from the vat practically dry through suitable apertures, substantially as described.

3. A process for the extraction of metals from their ores, consisting of the treatment of the material to be treated with a solvent solution in a closed revolving filter, assisting and maintaining the continued deposit and support, by a constant vacuum on the delivery side of the filter, of the solid residue upon the filtering-support so as to withdraw the moisture therefrom, discontinuing the vacuum to allow the fall by gravity of the dry residue from the filtering-support and removing the residue from the vat practically dry through suitable apertures substantially as described.

4. A process for the extraction of metals from their ores, consisting of the treatment of the material to be treated with a solvent solution in a closed revolving filter, assisting and maintaining the continued deposit and support, by a constant vacuum on the delivery side of the filter, of the solid residue upon the filtering-support so as to withdraw the moisture therefrom, introducing a wash solution within the receptacle for a thorough washing of the residues again to dryness, discontinuing the vacuum to allow the fall by gravity of the dry residue from the filtering-support and removing the residue from the vat practically dry through suitable apertures, substantially as described.

In witness whereof I have hereunto set my hand in presence of two witnesses.

CHARLES HENRY WEBB.

Witnesses:
FRANK HANCOCK,
CHARLES CARTER.